United States Patent [19]

Vajna

[11] 4,198,295
[45] Apr. 15, 1980

[54] PROCESS FOR INCREASING THE EXCHANGE YIELD IN ION EXCHANGE PROCESSES

[75] Inventor: Sandor Vajna, Reichenberger Str. 30a, 534 Bad Honnef, Fed. Rep. of Germany

[73] Assignee: Sandor Vajna, Fed. Rep. of Germany

[21] Appl. No.: 909,943

[22] Filed: May 26, 1978

Related U.S. Application Data

[63] Continuation of Ser. No. 781,946, Mar. 28, 1977, abandoned, which is a continuation of Ser. No. 672,256, Mar. 30, 1976, abandoned.

[30] Foreign Application Priority Data

Apr. 1, 1975 [DE] Fed. Rep. of Germany ....... 2514222
Sep. 30, 1975 [DE] Fed. Rep. of Germany ....... 2543573

[51] Int. Cl.$^2$ ............................................. B01D 15/04
[52] U.S. Cl. ................................. 210/25; 210/31 R; 210/34
[58] Field of Search .................. 210/24, 30 R, 34, 25, 210/31 R, 32, 289, 291

[56] References Cited

U.S. PATENT DOCUMENTS

| | | | |
|---|---|---|---|
| 2,447,135 | 8/1948 | Pick et al. | 210/289 |
| 2,660,558 | 11/1953 | Juda | 210/34 |
| 3,448,043 | 6/1969 | Vajna | 210/32 |
| 3,531,401 | 9/1970 | Crits | 210/34 |
| 3,645,921 | 2/1972 | Salem et al. | 210/34 |
| 3,918,906 | 11/1975 | Small et al. | 210/25 |

FOREIGN PATENT DOCUMENTS

1211597 11/1970 United Kingdom .

*Primary Examiner*—Charles N. Hart
*Assistant Examiner*—Ivars Cintins
*Attorney, Agent, or Firm*—Craig and Antonelli

[57] ABSTRACT

A process for increasing the exchange yield in ion exchange processes is disclosed wherein at least one reaction fraction stored with the previous carrying out of the same exchange reaction, a solution of the exchanging ions supplied from outside and water are delivered to a washed ion exchanger bed which is filled with water and which is charged with the ions which are to be exchanged; and after the discharge from the bed of the water and of a solution obtained as product, the same number of reaction fractions with the same volume is collected and stored as the number as that previously supplied, in order to be delivered as previously with the next carrying out of the same exchange reaction in the identical manner and in the same sequence, and wherein displacement occurring in the direction of flow and relatively to one another of those liquid particles which are delivered simultaneously or in immediate succession to the bed is substantially prevented until the discharge from the container of the bed is reached, and the co-ion content of the reaction fraction or fractions is kept constant by keeping constant the volume of the reaction fraction or fractions, of the solution supplied from outside and of the liquids discharged from the system and of the co-ion content of the solution supplied from outside.

33 Claims, No Drawings

PROCESS FOR INCREASING THE EXCHANGE YIELD IN ION EXCHANGE PROCESSES

This is a continuation of application Ser. No. 781,946, filed Mar. 28, 1977, which is a continuation of Ser. No. 672,256, filed Mar. 30, 1976, now abandoned.

The invention relates to a process for increasing the exchange yield in ion exchange processes, particularly those in which at least one reaction fraction is stored with the previous carrying out of the same exchange reaction, a solution of the exchanging ions supplied from outside and water are delivered to the washed bed which is filled with water and which is charged with the ions which are to be exchanged, and after the discharge from the bed of the water and of a solution obtained as product, the same number of reaction fractions with the same volume is collected and stored as the number as that previously supplied, in order to be delivered as previously with the next carrying out of the same exchange reaction in the identical manner and in the same sequence.

The ion exchange procedure is today most frequently employed in the treatment of raw or untreated water. It is possible by ion exchange to produce a high separation effect between the water and the dissolved ions. By way of example, with the extraction of salt from untreated water, the content of cations and anions can be reduced to about 0.15 to 0.30 percent, as a result of which the treated water satisfies the normal requirements. The effective volume capacity of the exchanger bed (generally indicated by EVC) is 70 to 80% of the total capacity of the exchanger bed, which hereinafter will be briefly designated as "bed". These reactions are generally indicated as charging, exhaustion or utilization. The reactions are terminated when the supply of ions contained at the commencement in the bed is exhausted. These are brought in the counter-reaction to the bed, which is generally referred to as regeneration.

For being able to describe these operations simply, and according to F. Helfferich, "Ion Exchange", McGraw-Hill, New York, 1962, the ions participating in the ion exchange are referred to as "counter-ions", the oppositely charged ions fixedly anchored on the framework of the exchanger as "poly-ions" and those ions of the solution which have the same charge as the poly-ions" are referred to as "co-ions" (see Helfferich, pages 6 and 7). The affinity relationships between the counter-ions and the poly-ions or co-ions are characterized by the separation factor (see Helfferich, page 153).

In order to distinguish the counter-ions from one another, those which are contained in the solution used for the reaction carried out according to the invention, for example, the regeneration, are referred to as "exchanging" counter-ions and those of the bed as counter-ions "to be exchanged". The exchanging counter-ions have with the regeneration of a strongly dissociated ion exchanger a lower affinity to the poly-ions than those which are to be exchanged. With the exhaustion which is connected therewith, the counter-ions which are to be exchanged reach the bed, which is charged at the commencement of this reaction with the exchanging counter-ions.

With the exhaustion, the separation factor has a considerably higher value than 1, i.e. the counter-ions to be exchanged have a much higher affinity for the poly-ions than the exchanging counter-ions. With the regeneration, the last-mentioned counter-ions have to be once again applied to the bed. In this case, the separation factor with strongly dissociated ion exchangers is smaller than 1. If it is a question of the regeneration of weakly dissociated ion exchangers, the value of the separation factor is greater than 1, because of the content of hydrogen ions (cation exchangers) or hydroxyl ions (anion exchangers) in the regeneration solution. The dissociation data are related with the cation exchangers to the poly-ions charged with hydrogen ions and with the anion exchangers to the poly-ions charged with hydroxyl ions.

The industrial ion exchange has until a few years ago been determined by the simple co-current procedure, with which the liquids in both exchange reactions of an exchange cycle are conducted downwardly through the fixed bed. The term "simple" is intended to express that all liquids flowing from the bed are immediately carried away, i.e. removed from the system. On account of the aforementioned size ratios of the separation factors, it is here necessary to use in the regeneration a considerable excess of the exchanging counter-ions in order to remove the counter-ions which are to be exchanged from the bed in such quantity that the initially mentioned high separation effects can be produced with the charging.

So that this process may be compared with the other known processes, the regeneration which can be carried out under defined conditions of a cation exchanger charged with sodium ions by hydrochloric acid is hereinafter used as an example. In the present case, approximately 180 to 200% of hydrochloric acid, related to the sodium ions removed from the bed—both measured in chemical equivalents (equ)—are necessary for charging the bed up to 90% of its total capacity with hydrogen ions. The concentration of all the waste waters which are formed with this ion exchange and referred to hereafter as "secondary waste water" amounts to about 1 to 3% by weight.

So as to reduce the excess of regenerating agents, processes with stored fractions have already been used with the commencement of the industrial use of the ion exchange procedure, in which processes the fixed bed had delivered thereto with the regeneration one fraction or more than one fraction which were obtained in the preceding exchange cycle, and only after the said fraction or fractions, the unused regenerant solution supplied to the system from outside and finally water. The same time from the bed were obtained: water and the spent regenerate, which were discharged, as well as one or more than one fraction, which had to be stored again. Thereafter, also spent washing water was obtained, and this likewise was discharged. The number of the fractions usually amounted to 1, seldom to 2 to 4 and in a few cases, when using fractions having very small volume, to 7 to 15. With this process, the hydrochloric acid requirement in the above comparison example could be reduced to 150 to 170% with an otherwise identical result. The concentration of the secondary waste waters here also amounted to about 1 to 3% by weight. This so-called simple fractionation procedure which is described by way of example in German patent specification Nos. 3 93 044 and 3 97 848 could not be introduced in the practice, however, despite great effort, because the effect achieved did not justify the technical expense. Today, it is scarcely used.

The simple counter-current process which has been used for about ten years and in which the liquids in one of the reactions of the exchange cycle are conducted from top to bottom and in the other from bottom to top through the fixed bed, represents an important development. The discharging liquids are immediately carried away. In this process, it is not necessary to conduct the regeneration of the bed to such an extent as with the prior known processes, since it is possible with the counter-current principle to produce simultaneously high exchange yields in both reactions. The chemicals used in the regeneration are therefore employed with a good yield and the separation effect at the time of charging is even higher than in the simple co-current process. Nevertheless, this can only be achieved with a relatively low value of the EVC. In the comparison example, the consumption of hydrochloric acid by this process amounts to 120 to 130% with an EVC of 75% of the total capacity. The concentration of the secondary waste waters is here also at about 1 to 3% by weight.

Almost simultaneously with the counter-current process, several processes have been developed with which the exchange reactions are carried out with unmoved fillings of the exchanger in the simple co-current process, the solutions and the water which are supplied from outside being simultaneously introduced into the filling at positions which are spaced from one another. If a predetermined limiting value of a characteristic property is reached in the effluent, the supply of the liquids is shut off and the filling is displaced in its container by a certain section opposite to the direction of flow of the liquids and the front section transported to the counter reaction. The space which thereby has become free is filled with freshly regenerated or charged exchanger resin. The liquids are then once again supplied until the limit value is reached again. The number of the sections traversed in the regeneration is larger than those traversed in the exhaustion. Using this processer, the regenerating ions are used practically just as well as with the simple counter-current process and the value for the EVC is also of approximately the same size. It is also possible when using these processes to work with solutions which are of higher concentration than that which was possible in the processes already referred to above. The regenerates which are obtained have a concentration of 40 to 60% of the solution supplied from outside and the concentration of the secondary waste waters lies at about 4 to 8% by weight. However, in spite of these advantages, these known processes were unable to supplant the simple counter-current process, because the installations necessary for carrying out the said process are too complicated.

At approximately the same time, there was also developed a fifth process, in which there were certainly used stored fractions, as with the simple fraction procedure, but which nevertheless differed fundamentally from the latter. According to this process, stored fractions are not only used in the exchange reaction, but also after the completion thereof with the displacement of the reaction solution by water and advantageously also before commencement of the exchange reaction with the displacement of the water contained in the bed by the reaction solution. The mixing of the fractions obtained from the bed until they are used again in the next cycle is intentionally prevented or at least controlled. Specific measures serve to guarantee a uniform flow of the liquids through the stationary bed. This process, which is described for example in German patent specification No. 14 42 500 and U.S. Pat. No. 3,448,043, which is also referred to as an intensive fraction process (abbreviated as IFP) has been developed for use for preparative purposes, with which, in at least one ion exchange reaction of the cycle, solutions are obtained of which the salt content has such a value that the higher expense for the installation and the operation thereof is justified. With the IFP, the exchanging counter-ions can always be used to a high degree and it is possible to work with concentrated solutions, so that the concentration of the solutions which are produced can reach 80 to 90% of that of the solutions being used. In the comparison example, the consumption of hydrochloric acid falls to 103 to 104% with the IFP procedure, the EVC being at 85 to 90% of the total capacity. The concentration of the secondary waste waters amounts to about 10 to 15% by weight. Corresponding results are achieved with the regeneration of the ion exchangers which are used in the cases initially referred to for the treatment of raw water.

In spite of these good results, the IFP has not found general use in connection with the treatment of raw water. It is true that this process has an advantage as compared with the simple counter-current process as usually employed at the present time as regards the use of the regenerating agent, but this in itself is not sufficient to compensate for the greater expense for the installation and the running thereof. The considerably higher concentration of the secondary waste waters has not so far had any such great significance that it could play a part as regards the compensation.

For a number of years, the protection of the environment has become of increasing importance. Already at the present time considerable standards are set as regards the purity of the discharged waste waters or sewage. In many industries, waste waters are formed which may no longer be discharged into rivers or into the sea. Because of the high separation effect initially referred to, the ion exchange for removing the harmful or toxic ions or the salts which are present in excessive quantities is per se better suitable than all other known processes, as for example electrodialysis or reverse osmosis. However, the first disadvantage of the ion exchange consists in that, in the secondary waste water, with the cation exchange, there is additionally obtained at least one equivalent of salt per equivalent of removed ion and, with the demineralization, additionally at least two equivalents of salt per equivalent of removed salt. These minimum quantities would also be obtained if one were able to manage with the equivalent quantity of the regenerating agent. The second disadvantage is that the concentration of the secondary waste waters is too low, so that the disposal thereof raises at least the same problem as the original waste water.

For the ion exchange to be able to be used in connection with the elimination of the waste waters in industry and possibly also in the municipalities, it must conform to the following conditions:

1. The consumption of the exchanging counter-ions necessary for the regeneration is to be very close to the value which is equivalent to the counter-ions to be exchanged.

2. The secondary waste water of the ion exchange is to have a highest possible concentration, so that the disposal thereof does not raise any insoluble problems. These problems are completely avoided if the salt or salts of the secondary waste water can be exploited. The exploitation, with which usually the water has to be separated from the dissolved salt, is influenced by the concentration of the solution which is obtained. It bears a part or in certain circumstances also all the disposal costs. However, even when the secondary waste water is to be chemically treated, deposited or transported into the sea, the costs for this depend on the concentration of the secondary waste water.

3. The overall efficiency is to be as favorable as possible, i.e. the sum of all costs which are caused with the ion exchange by the establishment and the operation of the installation and the disposal of the secondary waste water, is to be as low as possible, so as more particularly to promote environmental protection.

None of the known ion exchange processes is able to satisfy all these conditions. The process which comes closest to this target is the IFP, which meets the first two conditions, but can only partly comply with the third condition because of the expense for the installation. The judgement concerning the use of ion exchange for the elimination of waste waters is therefore generally critical. In Winnacker-Küchler, "Chemishche Technologie", C. Hanser Verlag, Munich, 1975, Volume 7, page 700, it reads that the demineralization from waste waters by means of ion exchange is not a practical solution capable of general use.

The invention has for its object to carry out ion exchange processes in such a way that the previously mentioned disadvantages are avoided. With a lowest possible expense for the establishment and operation of the installation, a highest possible exchange yield or rate is to be obtained, while the exchange products to be discharged from the installation are to be able to be disposed of at lowest possible expense, so as more particularly to be able to satisfy the conditions prescribed for environmental protection. The exchange yield is to be increased with the same or even smaller consumption of chemicals, for example, for the regeneration.

The basis for the achievement of this object is the simple fraction process with one or more reaction fractions in accordance with that procedure wherein at least one reaction fraction stored with that previously used for carrying out the same exchange reaction, a solution of the exchanging ions supplied from outside, and water are delivered to the washed bed which is filled with water and which is charged with the ions which are to be exchanged, and after the discharge from the bed of the water and of a solution obtained as product, the same number of reaction fractions with the same volume is collected and stored as the number as that previously supplied, in order to be delivered as previously with the next carrying out of the same exchange reaction in the identical manner and in the same sequence, and it is proposed according to this invention to carry out this process in accordance with the following further procedures, i.e.

(a) a displacement occurring in the direction of flow and relatively to one another of the liquid particles which are delivered simultaneously or in immediate succession to the bed is substantially prevented until the discharge from the container of the bed is reached, and (b) the co-ion content of the reaction fraction or fractions is kept constant by keeping constant the volume of the reaction fraction or fractions, of the solution supplied from outside and of the liquids discharged from the system and of the co-ion content of the solution supplied from outside.

In accordance with the invention, for preventing, or at least reducing, the relative displacement of the liquid particles delivered from the supply line simultaneously in the bed in the direction of the flow, the liquid to be delivered to the bed, after leaving the supply line, is distributed in the air space above the bed uniformly on to the bed cross-section. Known devices, as for example a spiral nozzle, are used for this purpose. For the same purpose, the height of the liquid layer which is disposed above the exchanger layer of the bed is kept as small as possible, advantageously between about 1 to 5 cm. The regulation of the height of the layer is effected by means of known devices, as for example, a pair of floats, one of which responds to the level of the exchanger layer of the bed and the other to the level of the liquid layer, and the difference in height of the two floats serves to deliver an impulse for regulating the speed of the supply and/or discharge of the liquids from the bed. The harmful effect of the dead volume of this liquid layer is eliminated by the jets of liquid from the supply line striking the said layer at high velocity, as a result of which the layer is maintained in a state of steady and strong motion.

Disadvantageous displacement of the liquid particles relatively to one another can also occur inside the bed itself, i.e. inside the exchanger layer. Of significance in this respect are the displacements which occur in the direction of flow of the bed, i.e. in its longitudinal direction. In order to prevent or at least substantially to reduce these displacements, the base on which the bed is resting inside the exchanger container is provided in known manner with uniformly distributed narrow throughflow gaps, (e.g. by filter nozzles) which do not allow the resin granules to pass through and cause a damming of the flow, as a result of which the latter is uniformly distributed over the throughflow gaps. In addition to ensuring that the liquid is uniformly supplied to the bed surface, this mode of operation also ensures that the flow in the bed is virtually always uniformly distributed over its cross-section and the leading or lagging of individual liquid particles is at least largely avoided.

Relative displacements can also occur in the space between the base bearing the bed, the so-called nozzle bed, and the actual container base. This space is filled with liquid during the exchange reaction. Entire liquid component quantities, which have simultaneously issued from the bed can also be displaced relative to one another in this space. The term "liquid component quantity" refers to the total quantity of all the liquid particles which leave the bed in direct succession within a given finite time interval, for example, a number of seconds. These liquid component quantities can be displaced relative to one another in the space beneath the nozzle base, particularly if the density of the successive component quantities increases. As a result of the relative displacement between the component quantities, a marked displacement is produced between liquid particles supplied to the bed in direct succession. To eliminate or at least alleviate this effect of the base space, according to the invention its volume is reduced to the maximum extent within the permissible limits. The remaining space can then be filled, for example, in a conventional manner with filler material.

In the process according to the invention it is proposed that the co-ion content of the one or more reaction fractions should be kept constant in the repeated identical exchange reactions, for which purpose, the volume of the reaction fraction (s), the volume and co-ion content of the solution supplied from outside and the volume of the liquids discharged from the system are kept constant.

The state or condition as described here is not immediately reached with the commencement of a new series of exchange cycles, but can only be reached after carrying out several cycles with the said values being kept constant. In this stationary state, the composition of all liquids participating in the exchange remains constant, except for the random deviations. This reproducibility of the composition is necessary for achieving the advantageous industrial results of the process according to the invention.

Using the measures which have been previously referred to there is already produced a decided improvement in the exchange yield which can be achieved with the simple fraction process by a comparatively small expense for the establishment and operation of the installation. An additional improvement as regards the results obtained by the process is achieved if each reaction fraction is in itself mixed in its container. The uncontrolled relative displacement of the liquid particles or liquid component quantities is avoided in this way. The fractions are mixed as thoroughly as possible during or shortly after their deposition. This can be achieved in known manner, for example, by means of stirrer mechanisms or by a suitably strong whirling action with the introduction into the containers.

The fraction or the fractions and the solution supplied from outside, in the case, if it is fed to the bed by the same pump. are generally not supplied directly to the pump which feeds them to the bed, but through a common storage container or transitory buffer zone. So that the mixing of solutions to be supplied in succession is kept as low as possible, it is also proposed that the volume of the storage container should be kept as small as possible and that this should possibly also be filled with filler bodies.

For establishing whether or not the co-ion content of the at least one reaction fraction is constant, it is in principle possible for the reaction fractions themselves to be investigated. However, it is more advantageous to check and to control the composition of a solution obtained from the bed after the reaction fraction or, with several fractions, after the last reaction fraction. As long as the co-ion content of the control solution is changing, the stationary state is still not reached or is no longer existing.

For correctly complying with this indicator function, the co-ion content of the control solution should be changed in a manner which can be easily measured, also with small alterations in the system. Consequently, it has proved to be advantageous to collect the control solution immediately after the (last) reaction fraction and to use it for control purposes. In this case, the co-ion content of the solution is sufficiently large for being able to determine it accurately, and it quickly reacts to the changes in the system.

The arrival to the stationary state in the manner as described still does not mean that the system is in the optimal state. This is only achieved when the co-ion content of the reaction fractions with a fixed volume is at its maximum. It is thereby ensured that the ion exchange taking place in each fraction leads to a maximum conversion under the given conditions. The size of the maximum value also depends on the process which is used for the displacement of the reaction solution from the bed. The method of displacement determines the loss of co-ions and the counter-ions connected therewith in the spent washing water which is discharged from the system. The greater the loss, the smaller is the co-ion content of the reaction fraction or fractions. On the other side the displacement method prohibits the dilution of the reaction fraction or fractions by the water used for displacement. The greater the dilution, the smaller is the co-ion content of the said fraction with constant volume.

A considerable improvement in the results of the simple fraction process is already obtained by maintaining the technical processing conditions which have been heretofore described, even although these results still do not reach the results which are produced by the IFP method and which of course are obtained with a greater expense for equipment, but under otherwise identical conditions. It has now been found that the results of the process according to the invention, operating with a considerably smaller number of fractions, can be further improved if the size of the fractions is established in a suitable manner.

In accordance with this discovery, it was attempted to provide a rule or operating standard which is capable of general application and which can be used independently of the exchange reaction and the conditions under which it is carried out. This rule is characterized in that the exchange yield taking place with the passage of the reaction fraction or fractions, during their contact with the bed, amounts of more than 50%, advantageously more than 70% and with particular advantages more than 85% of the maximum possible exchange yield. It can also be used with advantage outside the scope of the invention, since it leads to a reduction in the number of the reaction fractions in every case, i.e., also independently of the aforesaid technical measures used in the process.

According to the invention, the exchange yield produced in the reaction fraction when it comes into contact with the bed in used as a characteristic feature of said fraction. So as to be able to indicate the yield with a number having no dimensions, the yield achieved in the reaction fraction has been related to the exchange yield which is the maximum possible under the given conditions and expressed as a percentage of the latter. The maximum possible exchange yield—hereinafter referred to as MY—is influenced by the composition of the reaction fraction and of the bed at the time of supply, the separation factor of the reaction under these conditions, the temperature, the throughflow velocity of the fraction, etc., that is to say, by all the working conditions which determine the manner in which the ion exchange reaction proceeds. The value of MY therefore differs from case to case; by indicating as a percentage the yield which is produced with the passage of the reaction fraction being used, a value is however provided which is equally valid for each exchange reaction.

With the determination of the MY, it is advantageous to start from a state of charging of the bed which does not exist at all with the actual operation of the process. For this purpose, a solution, having a composition corresponding to that of the solution which is supplied before the reaction fraction and which possibly is also a fraction is supplied to the bed until an equilibrium between the two is established, the conditions as regards the actual operation of the process being maintained. The bed is thereafter washed out. This state is completely defined and can be reproduced. Another solution, the composition of which is the same as that of the reaction fraction to be investigated, is now supplied to the bed as thus prepared. Under the conditions which prevail when actually carrying out the process, the solution is conducted through the bed until the equilibrium is reached, i.e., the effluent has the same composition as the inflow. The collected effluent is then analyzed and the quantity of the exchanged counter-ions is determined. This quantity represents the MY.

The co-ion content of the reaction fraction or fractions is now chosen to be sufficiently large that the exchange yield which occurs with the passage of the reaction fraction or fractions has, in accordance with the invention, the value which is given or determined by the operating standard.

The displacement of the one reaction fraction, or when there are several, the last reaction fraction, from the bed can take place in accordance with the principles of the IFP by a stored displacement fraction which, after the (last) reaction fraction, is recovered, stored and is used again in the same manner in the next exchange cycle. In particular, a previously stored displacement fraction of constant volume is used for the displacement of the (last) reaction fraction from the bed, said displacement fraction having a co-ion concentration which is lower than that of the solution supplied from outside and which, after recovery of the (last) reaction fraction from the bed, is collected, stored and, when next carrying out the same exchange reaction, is used again in the same manner as that in which it had been formed, the displacement fraction being displaced from the bed by water. The displacement fraction is advantageously mixed in the container as heretofore described. This displacement has the advantage that the concentration of the co-ions in the reaction fraction or fractions has the maximum value which can be achieved, since with this displacement method the loss of ions in the spent washing water of the bed is at the lowest possible value. The concentration of the co-ions reaches, in the (last) reaction fraction, a value which is practically the same as that in the solution which is supplied from outside, except for the quantity of water which the bed gives off or takes up as a consequence of the change in its hydration during the ion exchange. This water quantity differs from case to case and therefore always has to be determined experimentally.

The co-ion concentration of the displacement fraction is preferably adjusted so that the co-ion concentration of the displacement fraction is kept at 30 to 70%, advantageously 40 to 60%, of the co-ion concentration of the solution supplied from outside. In this case, the co-ion concentration of the (last) reaction fraction is preferably kept practically equal to that of the solution supplied from outside. It is necessary in this connection to take into account the swelling pressure which occurs with the decrease in the concentration of the delivered solution, especially with highly dissociated ion exchangers, in the exchanger grain, pellet, granule or the like particle, the grain extracting water from the increasingly dilute solution. When the difference between the concentration of the (last) reaction fraction and that of the liquid used for the displacement is too large, the swelling pressure is able to cause the exchanger grain to burst. The concentration of the displacement fraction, when adjusted so that the co-ion concentration of the displacement fraction is kept at 30 to 70% of the co-ion concentration of the solution supplied from outside, avoids any such damage to the exchanger grain. The concentration is to be so established within the indicated limits that the difference of the co-ion concentration from the solution supplied from outside and the displacement fraction does not exceed 2.0 to 2.5 equ/l. This value can only be established by experimentation, by testing displacement fractions of different concentration in a long time test or during the operation of the installation.

The same disadvantageous effect also occurs when the co-ion concentration of the displacement fraction is higher than 2.0 to 2.5 equ/l. In such cases, this displacement fraction, instead of being displaced from the bed by means of water, is displaced therefrom by at least one additional displacement fraction, which is likewise stored and is stored again after it has been used. The conditions to be maintained in this respect are such that for the displacement of the displacement fraction, there is used at least one additional displacement fraction, the co-ion concentration between the respective displacement fractions advantageously decreasing in each case by about 60 to 80%, while the water for the displacement after this at least one additional displacement fraction is supplied to the bed.

As regards the procedures heretofore noted, it is the (first) displacement fraction which is to be used as the control solution to be employed according to the procedure set forth heretofore.

To decrease the expenses further in the process according to the invention it is advantageously foreseen to discard the solution, obtained after the reaction fraction or after the last reaction fraction to be stored, instead of storing it too as one or more displacement fraction (fractions).

If the concentration of the solution supplied from outside does not exceed 2.0 to 2.5 equ/l, this can be directly displaced from the bed by water. As a result, the installation is more simple than in the preceding case. In this case, some water is mixed with the (last) reaction fraction and a part of the solution supplied from outside is mixed with the discharged washing water. It has proved to be advantageous to terminate the withdrawal of the (last) reaction fraction when its average co-ion concentration has reached the value such that the co-ion concentration of the (last) reaction fraction is higher than 65% and advantageously higher than 75% of the co-ion concentration of the solution supplied from outside.

If water is used for displacing the (last) reaction fraction, the solution discharging from the bed after recovery of the (last) reaction fraction is used as control solution. The volume of the control solution is established so that when water is used for the displacement of the (last) reaction fraction, a control solution is collected after recovery of the (last) reaction fraction, the volume of said control solution advantageously being less than 50% of the bed volume, in order to adjust its concentration to a value which can be easily determined. The control solution is discharged after its composition has been established.

In those cases in which the co-ion concentration of the solution supplied from outside is higher than 2.0 to 2.5 equ/l, the use of water for displacement purposes would be harmful. In those cases the invention provides for using one or more than one solution for the displacement of the (last) reaction fraction, which solution or solutions are freshly prepared in each exchange cycle from the solution supplied from outside and water. The major part of the ion content of this solution or solutions reaches the (last) reaction fraction, while a far smaller part passes as a loss into the spent washing water of the bed. In particular, one or more than one solution is used for the displacement of the (last) reaction fraction, which solution or solutions are prepared afresh in each case from a part of the solution supplied from outside and from water in each exchange cycle, and when several newly prepared solutions are used, the co-ion concentration thereof decreases from solution to solution, and water is supplied to the bed for the displacement of the newly prepared (last) solution.

The concentration of the solution or solutions to be newly prepared in a manner such that the co-ion concentration of the first, newly prepared solution is adjusted to approximately 30 to 70% and advantageously to 40 to 60% of the co-ion concentration of the solution supplied from outside and the co-ion concentration of the possibly additional newly prepared solution or solutions is respectively adjusted to about 20 to 30% of the co-ion concentration of the preceding, newly prepared solution. Here also the difference between the concentration of the solution supplied from outside and the newly prepared solution, or between the newly prepared solution and water, is not to exceed 2.0 to 2.5 equ/l. If this were the case, a second solution and possibly also additional solutions with correspondingly reduced concentration will be newly prepared.

The volume of the newly prepared solution or solutions is given by the limitation of the quantity of water used for dilution purposes, i.e., the quantity of the water used for the newly prepared solution or solutions is equal to or substantially equal to that quantity of water which the bed extracts from the newly prepared solution or solutions during the passage therethrough. The result hereby obtained is that the co-ion concentration of the (last) reaction fraction is only slightly reduced and the ion loss which occurs is kept low. This co-ion concentration is thereby adjusted to about 75 to 85% of the concentration of the solution supplied from outside.

The control solution to be used (as heretofore described), the volume of which amounts to less than 50% of the bed volume is in this case taken up by water after the (last) reaction fraction with the displacement of the newly prepared solution from the bed.

In each case which has been discussed, it is sufficient, if in accordance with the foregoing, for only the co-ion concentration of the last reaction fraction to be observed when there are several reaction fractions. The penultimate fraction is in fact formed in the next exchange cycle from the last fraction and that supplied before hand from the penultimate fraction, etc. All concentration values compared with one another must always be corrected in accordance with the said change in hydration of the bed.

The examination of the control solution can be carried out by analyzing the mixed solution, and this is advantageously done with an automatic analysis instrument. There is simultaneously obtained the co-ion content of this solution, which content is practically equal to the ion loss when the displacement is with water or respectively newly prepared solutions. However, it is more expedient to investigate a predetermined part of the control solution for the purpose of controlling the composition of the solution obtained after the (last) reaction fraction from the bed, there is used a part of the solution as obtained at a fixed moment in time or after discharge of a fixed volume or a fixed quantity from the bed. Known physical methods are advantageously used for this purpose, for example, pH, conductivity, density or color measurement, with which the value to be established is immediately obtained.

After the stationary state has been adjusted, the ion content is used for establishing the other measures which are to be taken. The necessary change in the state of the system is carried out so that the total volume of the liquids discharged at the commencement of the exchange reaction is utilized for adapting the composition of the solution obtained after the (last) reaction fraction from the bed, it being possible for the concentration of the solution to be reduced by increasing the total volume or increased by reducing the total volume. The maximum value of the co-ion content of the reaction fraction or fractions is then obtained when the co-ion loss is within certain limits, i.e., the co-ion content of the control solution is adjusted to below 4% and advantageously to below 3% of the co-ion content of the solution supplied from outside. The extent of the loss is also important, because the corresponding ion quantity is carried away with the spent wash water.

The process according to the invention makes possible an operation with concentrated solutions. It has been found that the value of the MY in a reaction between hydrochloric acid and the sodium ions of a strong acid cation exchanger in concentrated solutions is greater than in more dilute solutions under the same conditions. For example, the value of the MY when using a 4 N-chloride solution was 556 m.equ, while it was only 475 m.equ with a 1.8 N-chloride solution. In both cases, the concentration of the solution as regards hydrogen ions was 55% and as regards sodium ions 45% of the total concentration. The total capacity of the bed, a strongly acid cation exchanger consisting of polystyrene-sulphonic acid, was 1200 m.equ. It is accordingly desirable for the co-ion concentration of the solution supplied from outside to be in accordance with claim 22. The ratio between the co-ion concentration of the solution supplied from outside and the reaction fraction is obtained from the displacement method which is employed.

With even higher concentrations, in the range of about 5 N, there is a constriction of the internal capillaries of the exchanger grain or particle as a result of which the speed of diffusion is reduced. Accordingly, it takes longer for a certain state to be reached than is the case with a lower concentration. Here also there is once again to be found the advantage of the invention, with which the measurement of the fractions is effectd in accordance with the effectively achieved exchange yield. With these high concentrations, it is necessary to raise the ion content of the fraction, so as to achieve the same yield, expressed as a certain percentage of the MY, as that obtained at a lower concentration.

Using the process according to the invention, it is advantageously possible substantially to obtain the results of the IFP method with one reaction fraction or slightly more than one reaction fraction, the cost for the establishment and operation of the relevant installation being however very much lower, so that the ion exchange, contrary to the general opinion, can also be used with advar:age in connection with the elimination of the waste waters.

It is a requirement in many cases that the product to be discharged from the system has a highest possible concentration. To be understood by the term "product" is meant to include also the spent regenerate which is to be carried away, i.e., the product can be exploited or it can also be useless. In order to achieve a highest possible concentration, the water flowing at the start of the exchange reaction from the bed and the product solution subsequently obtained are separated from one another. In accordance with the invention, it is proposed for this purpose, that the volume of the first part of the liquid obtained from the bed at the commencement of the exchange reaction is to be of such a quantity that the concentration of the remaining product solution amounts to about 70 to 80% of the concentration of the solution supplied from outside. The value of the latter solution is corrected by taking into account the quantity of water which the bed discharges or takes up during the exchange reaction. The ion loss which occurs under the given circumstances by the discharge of the first part makes up about 2 to 10% of the ion content of the product.

In order to minimize the mixing of the first part of the discharging liquid and the product solution, displacement fractions are advantageously used so that one or more than one stored displacement fraction is used for separating the first liquid part to be discharged from the solution obtained as product, which fraction or fractions is or are initially supplied to the bed filled with water and is or are obtained from the bed after the first liquid part which is to be carried away, is or are stored and used again in the next exchange reaction in the same way.

With the process according to the invention, salt-containing waste waters are formed at two locations: With the commencement of the exchange reaction, the ion loss makes up about 2 to 10% of the ion content of the solution supplied from outside, and finally about 0.2 to 4%. These ions are once again found in the secondary waste water leaving the system. For the purpose of eliminating these ions, it is proposed according to the invention to admix the dilute solutions obtained in addition to the product with the water which is to be treated, as a result of which its salt content increases by about 3 to 15%. It is true that this causes a correspondingly higher consumption of regenerating agent, but the result is thereby obtained that only the concentrated regenerate, of which the concentration is only slightly lower than that of the solution supplied from outside, and the treated water, which can be discarded or used again without any difficulties, emerge from the system.

The process according to the invention can with advantage be used not only in connection with the treatment of waste water, but also in connection with the removal of salt from brackish water and in connection with the softening or demineralization of raw or untreated water. In many cases, it is also possible to use the process for the production of chemical products from their raw materials, i.e., for preparative purposes.

The invention provides the greatest advantage when it is used in those exchange reactions of which the separation factor is smaller than 1 and is carried out with concentrated solutions. Included in such reactions is the regeneration of highly dissociated ion exchangers such as cation exchanger polystyrene-sulfonic-acid, i.e. Amberlite 1R120, Dowex 50, Lewatit S 100, zeo-karb 225 and as anion exchanger an alkyl or aryl-polystyrene-amide, i.e. Amberlite IRA 401, Dowex 1, Lewatit M 500, De-acidite FF. However, it can also be advantageously employed in other cases. Wnen working with concentrated solutions, the exchange isoplane or breakthrough curve (see Helfferich, page 424) also has a considerable dimension when the value of the separating factor is greater than 1, i.e. the quantity of the solution flowing from the bed between the break-through of the exchanging ions until their entry concentration is reached is considerable. This is especially applicable when the aim is to operate with a high EVC. The quantity of the water which enters the product as a consequence of mixing is proportional to the volume of the bed and independent on the value of the EVC. Therefore, when operating the same bed at a higher EVC, i.e. when a larger quantity of the counter-ions is exchanged, the quantity of the water mixed into the solution is by percentage a smaller amount. Consequently, under otherwise unchanged conditions, the concentration of the product is higher in proportion as the EVC is greater.

The process according to the invention is hereinafter more fully explained by reference to a number of examples.

EXAMPLE 1

The results obtained with the process according to the invention will now be compared with both those of the simple fraction process and those of the IFP.

(a) Simple Fraction Process

It is difficult to reproduce in the laboratory the simple fraction process as carried out on an industrial scale, as the dimensions of the bed, and accordingly those of its container, are very different. In the laboratory the diameter of the bed is generally 50–100 mm., its height 400–1,000 mm., whereas in industry, diameters of 1,000–4,000 mm. and heights of 1,000–2,000 are found. Not only is it possible to obtain regular distribution of the throughflowing liquids on the bed cross-section more easily in the laboratory, but the mixing conditions which produce the relative displacement of the liquid components relative to one another are also more favorable than on an industrial scale. As a result, it was necessary to modify the laboratory equipment normally used in order to obtain conditions more similar to industry.

The space or chamber above the bed was filled with water and the delivery of the liquids took place approximately 20 mm. above the bed, the latter being disposed at the bottom in the regenerated and reflushed state. A space or chamber was also provided beneath the bed, the relative volume of this space being smaller than the base space generally is on an industrial scale. Instead of 30% of the bed volume, in this case, the space only amounted to 20% thereof. The space filled with liquid above the bed amounted to slightly less than 20% of the bed volume at its deepest state in the cycle.

The volume of the bed employed was 540 ml; its total capacity amounted to 1080 mequ. It contained a strong acid cation exchanger consisting of polystyrol sulfonic acid (Lewatit (R) S 100, produced by Bayer AG, Leverkusen). In the case of each of the following variants, the exchange of calcium ions in the bed by the hydrogen ions of a 4 N hydrochloric acid was selected for the reaction. This reaction forms the basis for desalination of untreated water. A higher concentration than is normal in the simple fraction process was immediately selected in order to make possible a comparison with the process indicated hereafter. The throughput rate of the liquids was 50 ml/min.

60% of the bed volume or 120% of the solution supplied from outside was selected as the fraction volume. During the displacement or removal of this solution from the bed, the water quantity was so adjusted that the loss in the control solution and in the separately collected washing water varied between 2 and 2.5%. As a result, an average co-ion concentration of the fractions of 1.9 N, was obtained. 3 reaction fractions were used.

In order, for comparison purposes, to readily obtain the stationary state, also in the simple fraction process, the measure indicated under (b) in claim 1 was also used in the case of this known process.

The exchange rate was established by determining the calcium ion content in the solution discharged as product. The charging of the bed with calcium ions was carried out with a 1 N calcium chloride solution. The entire discharge was collected and its hydrogen ion content was determined, this being used to control the exchange rate. In the stationary state the calcium ion content of the product was identical to the hydrogen ion content in the outflow of the charging solution.

The known process was carried out according to the following schedule:

| Inflow | Vol. in ml | Outflow | Vol. in ml |
| --- | --- | --- | --- |
| Fraction 1 | 300 | first running + product | 920 |
| Fraction 2 | 300 | Fraction 1 | 300 |
| Fraction 3 solution supplied 4N-HCl | 300 250 | Fraction 2 Fraction 3 control | 300 300 |
| water | as required | solution | 300 |

The term "as required" indicates that the volume of water is so measured that the last indicated solution, in this case the control solution, is obtained at the outflow of the bed.

The fractions are all reaction fractions.

The volume of the discharged solution, first running+product, was so adjusted that the loss amounted to precisely 2% of the Co-ion content of the solution supplied.

After 8 exchange cycles, the stationary state was engaged; the following results were obtained therein:

| | |
| --- | --- |
| calcium ion content in the first running + product | 732 m val. |
| chloride ion content in the first running + product | 990 m val. |
| hydrogen ion content in the charging solution | 730 m val. |
| hydrochloric acid consumption in % of the removed Ca-ions | 137% |
| loss of control solution and used washing water relative to the co-ion content in the solutions supplied from outside | 2.0% |
| average concentration of the co-ions in the fractions | 1.9 N |

(b) Process according to the invention, displacement with water

The process according to the invention was carried out as the second variant. To do this, the volume at the parts of the equipment where a relative displacement of the solution components took place, was reduced to the extent that operation could still be continued. In addition, the quantity of liquid above the bed was reduced to 5–25 ml, corresponding to a liquid level of 0.4–2 cm and the space beneath the bed was reduced to 2.5% of the bed volume.

The operating schedule was the following:

| Inflow | Vol. in ml | Outflow | Vol. in ml |
| --- | --- | --- | --- |
| Fraction 1 | 300 | first running + | 593 |

-continued

| Inflow | Vol. in ml | Outflow | Vol. in ml |
| --- | --- | --- | --- |
| | | product | |
| Fraction 2 | 300 | fraction 1 | 300 |
| Fraction 3 solution supplied 4N-HCl | 300 250 | fraction 2 fraction 3 | 300 300 |
| water | as required | control solution | 300 |

In this case the loss was reduced to 1.5% by appropriately proportioning the volume of the first running+-product. The exchange rate in the 3 reaction fractions was between 85 and 95% of the (MA) (MY).

After 10 cycles the stationary state was engaged; the following results were obtained therein:

| | |
| --- | --- |
| calcium ion content in the first running + product | 771 mval |
| chloride ion content in the first running + product | 993 mval |
| hydrogen ion content in the charging solution | 772 mval |
| hydrochloric acid consumption in % of the removed calcium ions | 130% |
| Loss in the control solution and the used washing water relative to the co-ion content of the supplied solution | 1.5% |
| concentration of co-ions in the fractions | 3.4–3.5N |

The reduction of the relative displacement of the liquid components produced the following results:

The hydrochloric acid consumption was reduced from 137% to 130% the regenerated capacity increased from 732 mval to 771 mval; the volume of the first running+product was reduced from 920 ml to 593 ml. The simplest variant of the process according to the invention has thus provided a marked improvement in the results.

(c) Process according to the invention, Displacement with stored fractions

The third variant consisted of the method of implementing the process wherein the displacement of the solution supplied, from the exchange bed, was carried out by stored fractions. As is known, the result thereby obtained is that the reaction fractions have the maximum concentrations, that is, virtually the same as the supplied solution, and the loss is lowest. The volume of the reaction fractions was reduced from 300 to 200 ml, with the reflection that the ion content of one fraction in the preceding case was between 1020 and 1050 mval, whereas, in this case, when retaining the volume of 300 ml, it was between 1260 and 1275 mval. When the volume of the fractions was 200 ml, their ion content was reduced to 840–850 mval. The exchange rate had only dropped slightly over the fractions containing 1020–1050 mval. In this case it was between 80 and 90% of the (MA) (MY).

| Inflow | Vol. in ml | Outflow | Vol. in ml |
| --- | --- | --- | --- |
| Fraction 1 | 200 | first running + product | 547 |
| Fraction 2 | 200 | fraction 1 | 200 |
| Fraction 3 solution supplied 4N-HCl | 200 250 | fraction 2 fraction 3 | 200 200 |
| fraction 4 | 100 | fraction 4 | 100 |
| fraction 5 | 100 | fraction 5 | 100 |
| water | as required | | |

Fractions 1–3 are reaction fractions and fractions 4 and 5 displacement fractions.

After 12 cycles the stationary state was obtained, in which the following results were obtained:

| | |
|---|---|
| calcium ion content in the first running + product | 769 mval |
| chloride ion content in the first running + product | 1016 mval |
| hydrogen ion content in the charging solution | 773 mval |
| hydrochloric acid consumption in % of the removed calcium ions | 130% |
| Loss of spent washing water relative to the co-ion content of the supplied solution | 0.3% |
| co-ion concentrations of the fractions | 4.2–4.25 N |

The differences with respect to the results of the variant described in (b) are so slight that it can be determined that the displacement of the solution supplied from outside by water is virtually equivalent to the displacement by stored fractions as long as the teaching of the process according to the invention is followed in the first instance. Accordingly, in practice, it will be sufficient in many cases to obtain displacement by means of water alone.

(d) Process according to the invention, double fraction size

In this variant the effect of increasing the reaction fractions is to be determined. In so doing it is necessary to take into consideration the fact that, in the two preceding variants, fractions were used, with which the exchange rate was in the optimum range or approximate thereto.

The volume of the reaction fractions was doubled. As a result, their total volume was 1200 ml and their total ion content about 5000 mval. The exchange rate in the fractions was between 96 and 99% of the MY. The operating schedule was:

| Inflow | Vol. in ml | Outflow | Vol. in ml |
|---|---|---|---|
| Fraction 1 | 400 | first running + product | 547 |
| Fraction 2 | 400 | fraction 1 | 400 |
| Fraction 3 | 400 | fraction 2 | 400 |
| solution supplied 4N-HCl | 250 | fraction 3 | 400 |
| fraction 4 | 100 | fraction 4 | 100 |
| fraction 5 | 100 | fraction 5 | 100 |
| water | as required | | |

Fractions 1–3 are once again reaction fractions and fractions 4 and 5 displacement fractions.

In the stationary state obtained after 20 cycles, the following results were obtained:

| | |
|---|---|
| Calcium ion content in the first running + product | 783 mval |
| chloride ion content in the first running + product | 1003 mval |
| hydrogen ion content in the charging solution | 792 mval |
| hydrochloric acid consumption in % of the removed calcium ions | 126% |
| Loss in spent washing water relative to the co-ion content of the supplied solution | 0.25% |
| co-ion concentration of the fractions | 4.2–4.5 N |

By comparison with variant (c) it is found that by increasing the fraction size there occurs a 4% reduction in the acid consumption, (e) Use of IFP As the last variant, an earlier series of tests in which IFP was used, were used for comparison. In this series of tests the reaction fractions had only half the volume they possessed in variant (d). However, there were twice as many of them and thus the volume of the stored reaction fractions was the same. The total co-ion content was also identical. An exchange rate of 790 mval was obtained in this series of tests; this was virtually identical to the value obtained in (d).

This comparison shows that the exchange rate of the reaction is not affected by reducing the number of reaction fractions according to the process according to the invention.

It is thus possible to conclude that, by comparison with known simple fraction processes, the process according to the invention offers considerable advantages, even in its simplest form. It has also been shown that a reduction in the number of fractions over IFP does not adversely affect the results.

EXAMPLE 2

The process according to the invention was now checked in the exchange reaction between monovalent ions and in comparison with the IFP.

Tartaric acid was to be produced from its sodium salt with the aid of a strong acid cation exchanger charged with hydrogen ions. With the regeneration, a 4 N-hydrochloric acid was to be used in the IFP.

The bed contained 500 ml of Lewatit S 100, its total capacity amounting to 1000 m.equ. The throughput velocity of the liquids was 4000 ml/h with the charging and 3000 ml/h with the regeneration.

First of all, for setting the working conditions of the regeneration, a charging was carried out with a sodium chloride solution. For the following regeneration, the IFP was used with the following operating schedule:

| Inflow | Vol. in ml. | Outflow | Vol. in ml. |
|---|---|---|---|
| Fraction 1 | 150 | first runnings + product | 540 |
| Fraction 2 | 150 | fraction 1 | 150 |
| Fraction 3 | 150 | fraction 2 | 150 |
| Fraction 4 | 150 | fraction 3 | 150 |
| Fraction 5 | 150 | fraction 4 | 150 |
| Fraction 6 | 150 | fraction 5 | 150 |
| Fraction 7 | 150 | fraction 6 | 150 |
| Fraction 8 | 150 | fraction 7 | 150 |
| solution supplied 4N-HCl | 245 | fraction 8 | 150 |
| fraction 9 | 100 | fraction 9 | 100 |
| fraction 10 | 100 | fraction 10 | 100 |
| fraction 11 | 100 | fraction 11 | 100 |
| water | as required | | |

The fractions 1 to 8 are reaction fractions and 9 to 11 are displacement fractions.

After reaching the stationary state, the solution (first runnings+product) discharged at the start of the regeneration contained 970 m.equ. of chloride ions, 903 m.equ. of sodium ions and 67 m.equ. of hydrogen ions.

The co-ion concentration of the last reaction fraction, fraction 8, was 4.04 N and that of the first displacement fraction, the fraction 9, used as control solution, was 2.5 N. The acid consumption was therefore 108.5 and the EVC was 90.8% of the total capacity.

For carrying out the process according to the invention, first of all the value of the MY was established with 3 solutions of different composition, so as to establish the influence of a separation factor which is possibly varied with the bed composition:

1. Supplied to the bed completely charged with sodium ions was a solution which contained 4 equ/l of chloride ions and 2 equ/l each of sodium ions and hydrogen ions. After the effluent solution had reached the same composition as the inflow, the entire outflow was analyzed. It was shown from this that the bed had absorbed 465 m.equ. of hydrogen ions. This is the value for the MY.

2. Supplied to the bed which once again was completely charged with sodium ions was a solution of which the chloride ion concentration also here amounted to 4 equ/l, but which contained 3.1 equ/l of sodium ions and 0.9 equ/l of hydrogen ions. In this case, the MY amounted to 256 m.equ.

3. The bed was charged with 745 m.equ. of sodium ions and 256 m.equ. of hydrogen ions. The solution added to it again contained 4 equ/l of chloride ions with 1.98 equ/l of sodium ions and 2.02 equ/l of hydrogen ions. The MY amounted here to 238 m.equ. With the determination of the MY, there was also produced the charging curve of the bed, this curve representing the quantity of exchanging ions (H-ions) taken up by the bed in dependence on the quantity of the co-ions (Cl-ions) which had passed therethrough.

It was apparent from these measurements that a chloride ion quantity of about 1200 m.equ has to be contained in the separate reaction fractions for an intended exchange yield of 91 to 93% of the MY. With a 4 N-concentration, it was apparent therefrom that the volume of the separate reaction fractions was 300 ml. Three reaction fractions were prepared; thereafter the process of the invention was carried out in accordance with the following schedule.

| Inflow | vol. in ml. | Outflow | vol. in ml |
|---|---|---|---|
| Fraction 1 | 300 | first runnings + product | 520 |
| Fraction 2 | 300 | fraction 1 | 300 |
| Fraction 3 | 300 | fraction 2 | 300 |
| solution supplied 4N HCl | 245 | fraction 3 | 300 |
| fraction 4 | 100 | fraction 4 | 100 |
| fraction 5 | 100 | fraction 5 | 100 |
| fraction 6 | 100 | fraction 6 | 100 |
| water | as required | | |

After reaching the stationary state, the effluent with the commencement of the regeneration contained 975 m.equ of chloride ions, 910 m.equ of sodium ions and 65 m.equ of hydrogen ions.

The co-ion concentration of the last reaction fraction, fraction 3, was 4.1 N, that of the first displacement fraction, fraction 4, used as control solution was 2.5 N and that of the last displacement fraction, fraction 6, was 0.26 N. The loss was 0.5 m.equ.

The acid consumption was here 107.7% and the EVC was 91.0% of the total capacity.

The results in the two processes are therefore practically the same. The reduction in the number of the reaction fractions from 8 to 3 did not influence the results. The total volume of the reaction fractions was lower by 25% with the process of the invention than with the IFP, without thereby having caused any reduction in the exchange yield.

The problem as initially stated of recovering tartaric acid from sodium tartrate had now been fulfilled, by having used the sodium tartrate solution instead of the sodium chloride solution with the charging. The solution as produced contained 150 g/l of tartaric acid. After reaching the stationary state, 900 m.equ. of sodium ions were taken up by the bed from the tartrate solution. In the tartaric acid solution as obtained, the sodium ion content was 80 ppm, related to 100% tartaric acid.

EXAMPLE 3

A waste water or effluent contains, calculated as citric acid, about 5 g/l of sodium citrate. The solution is on the one hand too dilute for being directly processed again in this state, but on the other hand the citric acid which can be recovered therefrom is of value. The solution of the sodium citrate was conveyed or conducted over a strongly acid cation exchanger of Lewatit S 100, for replacing the sodium ions by hydrogen ions. The solution of citric acid as thus obtained was supplied to a weakly basic anion exchanger of a partially substituted amine on a polystyrene framework, Lewatit MP 62. The cation exchanger was regenerated according to the invention with hydrochloric acid, whereas the anion exchanger was regenerated with a 2.5 N sodium hydroxide solution in a simple co-current process. The sodium citrate which was obtained and of which the concentration exceeded 100 g/l, was returned to the manufacturing process.

The regeneration of the cation exchanger, which was contained in a bed of 530 ml with a total capacity of 1060 m.equ., was carried out in accordance with the following processing schedule.

| Inflow | vol. in ml | Outflow | vol. in ml |
|---|---|---|---|
| Reaction fraction | 600 | first runnings + product reaction | 598 |
| solution supplied 4N HCl | 175 | fraction control | 600 |
| solution supplied 2N HCl | 100 | solution | 200 |
| water | as required | | |

The throughput velocity was 3000 ml/h.

After adjusting the stationary state, the chloride content of the discharged solution was 890 m.equ. of which 870 m.equ. were sodium chloride and 20 m.equ hydrochloric acid. 8 m.equ of chloride ions were contained in the control solution. When the bed was charged with sodium ions of the sodium citrate, 865 m.equ. of citric acid were produced.

With 900 m.equ. of hydrochloric acid, it was therefore possible for 870 m.equ. of sodium ions of the bed to be replaced by hydrogen ions, so that the acid consumption was 103.4%. 82% of the total capacity of the bed could be utilized.

The exchange yield in the fraction of which the co-ion concentration in the stationary state was 3.05 N, was 96% of the MY after repeated determination. The co-ion concentration of the control solution was 0.04 N, so that the loss amounted to 0.8%. It has therefore been shown that, in this case, with the use of a single reaction fraction, it is possible to produce an effect which is equivalent to that with 3 reaction fractions in Example 2.

EXAMPLE 4

A waste water or effluent which is formed with the production of ammonium nitrate and contains small quantities of this salt is to be demineralized. The effluent with 8 g/l of ammonium nitrate is first of all passed through a strongly acid cation exchanger and thereafter through a weakly basic anion exchanger and thus completely demineralized. The charging takes place in upward flow and the regeneration in downward flow. The effluent is conveyed through two pairs of the aforesaid ion exchangers, of which the second pair is freshly regenerated, while the first pair has already been used once in the charging as second pair. A third pair is meanwhile regenerated. When the first pair is exhausted, the second pair takes its place and the freshly regenerated pair assumes the second position. The exhausted pair is regenerated. From the first cation exchanger, a dilute solution of nitric acid discharged, the acid being for the major part taken up by the first anion exchanger. The water emerging from the first bed pair contained about 20 ppm of ammonium nitrate, but after the second pair this content was only still 2 ppm.

A bed with 500 ml of Lewatit S 100 was used as cation exchanger and a bed with 750 ml of Lewatit MP 62 was used as anion exchanger.

The working schedules with the regeneration of the cation exchanger were according to the process of the invention:

| Inflow | vol. in ml | Outflow | vol. in ml |
|---|---|---|---|
| Fraction 1 | 400 | first runnings | 354 |
| Fraction 2 | 300 | fraction 1 | 400 |
| Fraction 3 | 300 | fraction 2 | 300 |
| Fraction 4 | 300 | product | 210 |
| solution supplied 4.7N HNO3 | 168 | fraction 3 | 300 |
| solution supplied 2.3N HNO3 | 88 | fraction 4 | 300 |
| water | as required | control solution | 300 |

After obtaining the control solution, the bed was once again washed out with 1.5 liters of water, in order to reduce the residual content of ammonium nitrate in the salt-free water which was produced.

The throughput velocity of the liquid was 3600 ml/h. The fractions 1 and 2 are displacement fractions and 3 and 4 are reaction fractions. The exchange yield in the latter amounted to 88% and 93% respectively, of the MY.

The control solution has in this case and by way of exception a high concentration of 0.18 N, in order to ensure that the co-ion concentration of the reaction fractions is adjusted to a high value, which here is 4.5 N. This corresponds to more than 90% of the concentration of the supplied solution of 5.0 N as corrected in accordance with the water absorption.

The first-running water, the control solution and the used washing water were delivered to the effluent to be demineralized and their salt content was the second time extracted in the next exchange cycle. The ammonium ion content of the said mixture was 55 m.equ. In the wash water to be demineralized, the ammonium nitrate content was 925 m.equ. The concentration of the ammonium nitrate solution as obtained was 3.9 N, corresponding to 27.5% by weight, so that a concentration almost 40 times greater was obtained of the solution demineralized.

The anion exchanger was regenerated as follows in accordance with the process of the invention:

| Inflow | vol. in ml | Outflow | vol. in ml |
|---|---|---|---|
| control solution* | 200 | first runnings | 813 |
| fraction 1 | 300 | fraction 1 | 300 |
| fraction 2 | 300 | fraction 2 | 300 |
| fraction 3 | 300 | product | 252 |
| fraction 4 | 300 | fraction 3 | 300 |
| solution supplied 7.3N-NH4OH | 137 | fraction 4 | 300 |
| fraction 5 | 200 | fraction 5 | 200 |
| fraction 6 | 200 | fraction 6 | 200 |
|  |  | control solution | 200 |
| water | as required |  |  |

*obtained in the previous cycle.

After obtaining the control solution, the bed was once again washed out with 2.5 liters of water.

The fractions 1 and 2, and 5 and 6, respectively are displacement fractions and the fractions 3 and 4 are reaction fractions. The exchange yield in the latter amounted to about 95% of the MY.

The co-ion concentration of the last reaction fraction amounted to 5.15 N and that of the control solution to 0.046 N. The use of the control solution as the solution to be first supplied makes possible, in known manner, the utilization of the hydroxyl ions which are contained therein.

Contained in the various, dilute solutions which formed at the positions as mentioned above were 70 m.equ of ammonium ions. These dilute solutions were also in this case once again supplied to the wash water to be demineralized and the salt was again removed. The concentration of the ammonium nitrate solution as obtained was 28% by weight.

The concentration of the combined product solutions of the cation and anion exchangers amounted to 27.7% by weight. This solution can be returned directly to the manufacturing process.

The consumption of regenerating agents amounted to 118%, related to that quantity of the introduced ammonium nitrate expressed in equivalents. Since the quantity of ions returned with the diluted solutions amounted together, related to the introduced quantity, to 13.5%, the effective consumption of regenerating agent was in the region of 104%.

Using the process according to the invention, it is also possible to achieve the condition that it is possible, from a waste water or effluent, to obtain a concentrate capable of further processing and a very pure water which likewise can be directly used. The consumption of the regenerating agents is kept within limits which economically are tenable. The process as described can be used in connection with the working up of effluents which, on the one hand, contain ammonia or ammonium salts and, on the other hand, contain nitrate or nitric acid.

What is claimed is:

1. In an ion exchange process wherein liquid comprising at least one reaction fraction, a solution containing exchanging counter ions, and water are passed through a washed ion exchanger bed which is filled with water and which is charged with counter ions to be exchanged, the sequential passing of the at least one reaction fraction, the solution containing exchanging ions, and water through the ion exchanger bed constituting an ion exchange reaction of an ion exchange cycle, with the at least one reaction fraction obtained from the corresponding ion exchange reaction in a previous cycle of passing at least one reaction fraction, a solution of the exchanging ions and water through the ion exchanger bed; and wherein after discharging from the bed the first runnings and a product solution containing exchanged counter ions, the same number of reaction fractions, having the same volumes, as delivered to said ion exchanger bed during said reaction is recovered and stored in order to be delivered to said ion exchanger bed as the at least one reaction fraction during the corresponding ion exchange reaction of the next successive cycle, the improvement comprising:

(a) each of said at least one reaction fraction is separately fed to the distributor for distributing liquids to said ion exchanger bed and is distributed to and is passed through said ion exchanger bed, in the same sequence as in the corresponding exchange reaction of the previous cycle, with the mixing with any other liquid distributed to and passed through said ion exchanger bed being minimized, and is separately stored in order to be separately fed to the ion exchanger bed, during the corresponding ion exchange reaction in the next successive cycle, in the same sequence;

(b) the co-ion content of said at least one reaction fraction is kept constant; and (c) the exchange yield taking place with the passage of the at least one reaction fraction being greater than 50% of the maximum possible exchange yield.

2. A process according to claim 1, characterized in that each of said at least one reaction fraction is stored in a separate container and is mixed while in its container.

3. A process according to claim 1, wherein each of the at least one reaction fraction and other liquids are distributed to the ion exchanger bed by distributing sequentially each of the at least one reaction fraction and other liquids in the air space above the ion exchanger bed uniformly over the cross section of the bed, whereby mixing of each of the at least one reaction fraction with other liquids during distribution to the ion exchanger bed is minimized.

4. A process as in claim 3, wherein, during the distribution of each of the at least one reaction fraction and other liquids, a liquid layer of a height of 1 to 5 cm, formed from the distributed liquids, is formed above the bed.

5. A process as in claim 1, wherein the base supporting the ion exchanger bed is fitted with uniformly distributed gaps, which let through only the liquids, and the bottom of the vessel containing the ion exchanger bed, under said base, is filled with a filler material, whereby mixing of each of the at least one reaction fraction with other liquids while passing through the ion exchanger bed and while passing between the base and the bottom of the vessel is minimized.

6. A process according to claim 1, wherein the volume of the at least one reaction fraction, the volume and co-ion content of the solution containing the exchanging ions, and the volume of the first running and product solution are kept constant in the ion exchange reaction in successive cycles, so that, when the co-ion content of the at least one reaction fraction is constant during the ion exchange reaction of three successive cycles, a steady-state is reached.

7. A process according to claim 6, wherein the co-ion content is held constant at a maximum value by changing the total volume of the first runnings and product solution discharged and discharging this same changed volume in ion exchange reactions of succeeding cycles until a steady-state is reached, whereby each of the at least one reaction fraction has the same co-ion content, then again changing the total volume of first runnings and product solution and continuing to discharge this again-changed total volume over succeeding cycles until a steady-state is reached, and continuing to change the total volume of first runnings and product solution discharged and using this changed volume over succeeding cycles until reaching a steady-state, until the maximum content of the co-ion content is found.

8. A process according to claim 1, including the further improvement that the co-ion content of the at least one reaction fraction is checked to determine whether the co-ion content of the at least one reaction fraction is constant.

9. A process according to claim 8, characterized in that, in order to determine whether the co-ion content of the at least one reaction fraction is constant, the co-ion content of a solution obtained from the bed after passage of the last reaction fraction is examined, whereby when the co-ion content of said solution is constant for the corresponding ion exchange reaction for three cycles, the co-ion content of said at least one reaction fraction is constant.

10. A process according to claim 9, characterized in that the solution obtained immediately following the last reaction fraction from the bed is used to control the co-ion content of the at least one reaction fraction.

11. A process according to claim 10, characterized in that the total volume of the liquids discharged from the bed at the beginning of the ion exchange reaction of a cycle is increased if the co-ion content of the control solution has to be reduced and the total volume of the said liquids is reduced if the co-ion content of the control solution has to be increased.

12. A process according to claim 1, including the further improvement that a displacement fraction of constant volume, obtained and stored in the corresponding ion exchange reaction of the preceding cycle, is distributed to the exchanger bed after the solution containing exchanging ions, whereby it displaces the solution containing the exchanging ions, said displacement fraction having a co-ion concentration lower than that of the last reaction fraction; and wherein said displacement fraction is collected, stored and, in the corresponding ion exchange reaction of the next successive cycle, is used again in the same manner to displace solution containing exchanging ions.

13. A process according to claim 12, wherein a control solution, to control the co-ion content of the at least one reaction fraction, is obtained after the displacement fraction is collected.

14. A process according to claim 13, characterized in that for the purpose of obtaining the maximum co-ion content in the at least one reaction fraction, the co-ion content of the control solution is adjusted to below 0.5% of the co-ion content of the solution containing exchanging ions.

15. A process according to claim 12, characterized in that the co-ion concentration of the displacement fraction is kept at 30–70% of the co-ion concentration of the solution containing the exchanging ions.

16. A process according to claim 1, characterized in that water is used for the displacement of the solution containing exchanging ions.

17. A process according to claim 16, wherein a control solution is collected after recovery of the last reaction fraction.

18. A process according to claim 17, wherein the volume of said control solution is less than 50% of the bed volume.

19. A process according to claim 17, characterized in that, for obtaining the maximum co-ion content in the at least one reaction fraction, the co-ion content of the control solution is adjusted to below 4% of the co-ion content of the solution supplied from outside.

20. A process according to claim 1, characterized in that at least one solution is used for the displacement of the solution containing exchanging ions, which at least one solution is prepared fresh in each exchange cycle from the solution containing exchanging ions and from water, and for displacement of this solution water is used.

21. A process according to claim 20, characterized in that the co-ion concentration of the first of said at least one solution is adjusted to approximately 30 to 70% of the co-ion concentration of the solution containing exchanging ions.

22. A process according to claim 20, characterized in that the quantity of the water used for the at least one solution is substantially equal to that quantity of water which the bed extracts from a newly prepared solution, having the same composition as said freshly prepared solution, during its passage therethrough.

23. A process according to claim 20, characterized in that a control solution is obtained after recovery of the last reaction fraction of said at least one reaction fraction.

24. A process according to claim 23, wherein the volume of said control solution is less than 50% of the bed volume.

25. A process according to claim 23, characterized in that, for obtaining the maximum co-ion content in the at least one reaction fraction, the co-ion content of the control solution is adjusted to below 2% of the co-ion content of the solution supplied from outside.

26. A process as in claim 20, wherein a sequence of solutions is used for displacement of the solution containing exchanging ions, and wherein the co-ion concentration of each successive of these displacement solutions decreases from the preceding solution.

27. A process according to claim 26, wherein the co-ion concentration of the first solution used for the displacement of the solution containing exchanging ions is adjusted to approximately 30–70% of the co-ion concentration of the solution containing exchanging ions and the co-ion concentrations of each of the following displacement solutions is 20–30% of the co-ion concentration of the preceding displacement solution.

28. A process according to claim 1, characterized in that the co-ion concentration of the solution containing the exchanging ions is chosen such that the co-ion concentration of the at least one reaction fraction reaches a higher value than 2 N.

29. A process according to claim 1, characterized in that the volume of the first runnings is so established that the concentration of the product amounts to at least 70% of the concentration of the solution containing the exchanging ions, after correcting for the water absorbed or discharged from the bed during the exchange reaction.

30. A process according to claim 29, characterized in that at least one displacement fraction, obtained and stored in the corresponding ion exchange reaction of the preceding cycle, is used for separating the first runnings from the product, which at least one displacement fraction is initially supplied to the bed filled with water, is obtained from the bed after the first runnings and is stored and used again in the corresponding ion exchange reaction in the next exchange cycle.

31. A process according to claim 1, characterized in that the exchange yield taking place with the passage of the at least one reaction fraction amounts to more than 70% of the maximum possible exchange yield.

32. A process according to claim 1, characterized in that the exchange yield taking place with the passage of the at least one reaction fraction amounts to more than 85% of the maximum exchange yield.

33. In an ion exchange process wherein liquid comprising at least one reaction fraction, a solution containing exchanging counter ions, and water are passed through a washed ion exchanger bed which is filled with water and which is charged with counter ions to be exchanged, the sequential passing of the at least one reaction fraction, the solution containing exchanging ions, and water through the ion exchanger bed constituting an ion exchange reaction of an ion exchange cycle, with the at least one reaction fraction obtained from the corresponding ion exchange reaction in a previous cycle of passing at least one reaction fraction, a solution of the exchanging ions and water through the ion exchanger bed; and wherein after discharging from the bed the first runnings and a product solution containing exchanged counter ions, the same number of reaction fractions, having the same volumes, as delivered to said ion exchanger bed during said reaction is recovered and stored in order to be delivered to said ion exchanger bed as the at least one reaction fraction during the corresponding ion exchange reaction of the next successive cycle, the improvement comprising:

(a) each of said at least one reaction fraction is separately fed to the distributor for distributing liquids to said ion exchanger bed and is distributed to and is passed through said ion exchanger bed, in the same sequence as in the corresponding ion exchange reaction of the previous cycle, with the mixing with any other liquid distributed to and passed through said ion exchanger bed being minimized, and is separately stored in order to be separately fed to the ion exchanger bed, during the corresponding ion exchange reaction in the next successive cycle, in the same sequence; and (b) the co-ion content of said at least one reaction fraction is kept constant.

* * * * *